3,522,120
METHOD OF ADHERING OLEFIN COPOLYMERS TO RAYON FIBERS AND FABRICS AND PRODUCT OBTAINED THEREFROM
Gian Vittorio Giandinoto and Mario Milano, Ferrara, Italy, assignors to Montecatini Edison S.p.A., Milan, Italy
No Drawing. Filed Sept. 20, 1966, Ser. No. 580,574
Claims priority, application Italy, Sept. 23, 1965, 21,151
Int. Cl. B29h 5/01; B32b 27/06
U.S. Cl. 156—110         19 Claims

ABSTRACT OF THE DISCLOSURE

A rayon-reinforced elastomer of a saturated amorphous copolymer of ethylene with a higher alpha olefin, suitable for use in tires, conveyor belts and the like, prepared by treating rayon fibers with a solution of an unsaturated polyester obtained by the reaction of maleic acid or maleic anhydride with an alkyl polyol, drying the treated fibers and mixing the treated fibers with a mixture of the copolymer, and organic peroxide, and a free radical acceptor, and then heating the mixture to a temperature of 110 to 220° C.

---

The present invention relates to a process for adhering olefin copolymers to rayon fibers or fabrics. In particular, this invention relates to the adhesion of saturated amorphous copolymers of ethylene with a higher alpha-olefin such as propylene or butene-1 to rayon fibers or fabrics. The invention also relates to products obtained by the foregoing process and to adhesive solutions used to effect adhesion of the aforementioned copolymers to rayon fibers.

It is well known that in the construction of various manufactured articles made of synthetic rubber reinforced with textiles, in particular, tires, conveyor belts, V-belts, and the like, it is important to obtain good adhesion between the synthetic rubber and the textile fibers making up the composition of the manufactured article.

As regards the relatively recent olefin elastomers obtained by copolymerization of ethylene with an alpha-olefin, there already have been proposed several methods for obtaining adhesion to natural or synthetic textile fibers, e.g., cotton, rayon, nylon, and the like. For this purpose there has been suggested the use of adhesive solutions comprising chemically modified ethylene-propylene copolymers (organic solution of chlorosulfonated ethylene-propylene copolymer) and also the use of aqueous latexes (preferably subjected to ageing for a suitable time with a phenol-formaldehyde resin prepared "in situ") of chlorosulfonated ethylene-propylene copolymers, or of such copolymers onto which have been grafted maleic acid, maleic anhydride, or acrylic or methacrylic acid.

It has now been found that highly satisfactory adhesion between rayon fibers or fabrics and the above mentioned copolymers is obtained when employing a solution (organic or aqueous) of an unsaturated polyester resin obtained by reaction of maleic acid or anhydride with an aliphatic glycol or polyol.

The present invention provides a process for adhering rayon fibers or fabrics to a saturated, amorphous copolymer of ethylene with an alpha-olefin. The process comprises treating the rayon fiber with an aqueous or organic adhesive solution containing desirably from about 3 to 10%, by weight of an unsaturated polyester obtained by reaction of maleic acid or anhydride with an aliphatic glycol or polyol in a molar ratio of from about 1:1 to 1:2. The thus-treated fiber is dried and then treated with a mixture made up of an amorphous saturated ethylene-alpha-olefin copolymer, an organic peroxide, a free radical acceptor and, if desired, reinforcing fillers, additives and antioxidants, and the whole is heated during a vulcanization time of from 5 minutes to 2 hours under a pressure of from 30 to 50 kg./cm.$^2$ at a temperature of from about 110° to 220° C., more preferably from about 140° to 180° to effect vulcanization.

Preferably but not necessarily the rayon fibres are pretreated with an aqueous solution containing 5–20%, preferably 15% of a phenol-formaldehyde resin of the type conventionally used to promote adhesion between cellulose fibers and natural or synthetic rubbers, said resin consisting of resorcinol and formaldehyde in a molar ratio of from 1:1 to 1:3, preferably in a ratio of 1:2. Said resin is prepared at room temperature, in the presence of a condensation catalyst (NaOH) used in such amount that the pH is comprised between 6 and 9, preferably is 7, same resin being successively left to age for from 2 to 7 hours.

The polyester resins which may be used for the purposes of the present invention, either in organic solution or in aqueous solution, are prepared by heating maleic acid or anhydride and an aliphatic glycol or polyol, preferably ethylene glycol and glycerine, to a temperature of from about 120 to 200° C., while stirring, the heating being for about 4 to 6 hours, and completing the reaction under vacuum until water formed by the reaction is eliminated.

The resins used according to the present invention are obtained by reaction of maleic acid or anhydride and ethylene glycol or glycerine using a molar ratio of from about 1:1 to 1:2. The resultant polyester should desirably have a molecular weight of from about 200 to 1000 and an acid number not lower than 50 mg. KOH/g.

For use as adhesive, the polyester resin may be dissolved in water or an organic solvent. If the polyester resin is of relatively low molecular weight it is desirably dissolved in water and then the pH adjusted to from about 6 to 7. If the resin is of relatively high molecular weight it is desirably dissolved in an organic solvent, preferably dioxane. The concentration of resin in the solution (whether aqueous or organic) may vary from about 3 to 10% by weight.

The olefin copolymers, which will adhere to rayon fibers according to the method of the present invention, are preferably made up of saturated, amorphous copolymers of ethylene with propylene or butene-1 and have an ethylene molar content of from 20 to 80% and molecular weight of from about 60,000 to 800,000, more preferably from about 80,000 to 500,000.

In order to effect the adhesion, the rayon fibers are immersed in the aqueous or organic solution of the unsaturated polyester resin and are then dried. The immersion is repeated, if necessary, until the amount of adhesive (polyester) which has been deposited corresponds to an increase by weight of from about 3 to about 20% based on the weight of the fiber.

As noted, desirably the fiber is pretreated with an aqueous solution of resorcinol-formaldehyde resin (molar ratio of resorcinol:formaldehyde from about 1:1 to 1:3) prepared in the presence of a condensation catalyst (NaOH) and permitted to age for from about 2 to 7 hours; the concentration of the resin in the solution is from 5 to 20%.

The pretreated fibers, to which unsaturated polyester resin is then added, are finally brought into contact with the mixture made up of olefin copolymer, vulcanizing agents, possible reinforcing fillers, additives, antioxidants, etc., and the whole is heated under pressure to effect the vulcanization.

Free radical acceptors which can be used for vulcanization along with an organic peroxide are well known in the art, e.g., sulfur, quinone compounds (such as p-quinonedioxime, dibenzoyl-p-quinonedioxime), compounds containing one or more vinyl or allyl groups (e.g. styrene, divinylbenzene, diallylmaleate, triallylcyanurate), the dimaleimides (N,N'-phenylenebisdimaleimide, p-phenylendimaleamic acid) and furfural (e.g. furfurylidenacetone, furfuramide) and derivatives thereof. The amount of free radical acceptor is desirably from about 0.1 to 10 parts by weight per 100 parts of copolymer. The organic peroxides are generally employed in an amount of from about 0.1 to 10 parts by weight per 100 parts of copolymer.

The evaluation of adhesion was carried out in the following examples using the H test method (Rubber Chem. Tech. 20 (1) 268 (1947)), a brief description of which is as follows. The specimen for the adhesion test is in the form of an H in which the two vertical legs consist of small vulcanized elastomer laminae of a 10 x 20 x 2 mm. size and in which the horizontal cross-piece is formed of a coated cord immersed in the two legs through their entire width and 1 mm. deep, so that the distance between the two legs shall be 6 mm.

The specimen is placed in a dynamometer provided with one fixed and one mobile clamp and is put under tension along the axis of the cord at a constant rate of 300 mm./min.

The adhesion, measured at 25° C., is expressed in kg. and indicates the force which is necessary to pull out the cord, which is immersed in the rubber for a length of 10 mm.

There follows a description of the preparation of an unsaturated resin formed of maleic acid and ethylene glycol (molar ratio of 1:1).

233.4 g. of ethylene glycol (3.76 mols) and 218.2 g. of maleic acid (1.88 mols), in a molar ratio of 2:1, are introduced into a 1000 cc. flask provided with stirrer, refrigerator, thermometer, nitrogen connection and vacuum connection. The whole is heated, while stirring, at 150° C. for one hour and then at 190° C. for 4 hours, and thereafter the apparatus is subjected to a slight vacuum (preferably the pressure is at 350 mm. Hg) and the reaction water is distilled at 190° C.

Finally the temperature is brought to 170° C. and maintained there until the acid number is about 50.

The following table shows the values of acid number and of molecular weight obtained as a function of the molar ratio between the components of the unsaturated resin.

TABLE

| Type of resin | Maleic acid/Ethylene glycol | | |
|---|---|---|---|
| Molar ratio | 1:1 | 1:2 | 2:1 |
| Acid number | 60 | 330 | 10 |
| Molecular weight | 800 | 320 | 202 |

The following examples will further illustrate the present invention. All parts are by weight unless otherwise stated.

EXAMPLE 1

Samples of 1650/2 den. rayon cord were treated with a number of aqueous solutions of maleic acid/glycerine resin (molar ratio=1:1) having various pH's and also with a number of aqueous solutions of a maleic acid/ethylene glycol resin (molar ratio 1:1) having various pH's and various resin concentrations. (The maleic acid/glycerine resin is prepared exactly in the same manner of the maleic acid/ethylene glycol resin.)

The thus coated and dried cord was used for the preparation of specimens for the H test and was caused to adhere, by means of vulcanization, to a mixture of the following composition:

|  | Parts by weight |
|---|---|
| Ethylene-propylene copolymer (containing 45 mol percent of propylene-ML(1+4) 100° C.=28) | 100 |
| Carbon black HAF | 30 |
| Sulfur | 0.4 |
| Alpha,alpha'-bis-(tert.butylperoxy)-diisopropyl-benzene | 2.1 |

Vulcanization: 40 min. at 165° C.

Table 1 shows the values of adhesion between the coated rayon fiber and the mixture of ethylene-propylene copolymer as a function of different concentrations and different pH's of the aqueous solutions of the two resins, as compared with the values obtained when employing the rayon cord as such, i.e. in the absence of adhesive resins.

TABLE 1

| | Type of resin | | | |
|---|---|---|---|---|
| | Maleic acid/ glycerine | | Maleic acid/ ethylene glycol | |
| pH of the solution | 4 | 7 | 4 | 7 |
| Resin concentration in the solution, percent | 5 | 5 | 5 10 | 5 10 |
| Adhesion in kg. (H test) ___ 4.5 | 5.1 | 6.4 | 9.4 7.4 | 7.0 8.1 |

EXAMPLE 2

Samples of rayon cord having the same characteristics as described in Example 1 were coated with solutions in dioxane of maleic acid/glycerine resins or of maleic acid/ethylene glycol resins, using various molar ratios of the components.

The cord, after drying, was caused to adhere, by means of vulcanization, to elastomeric mixes having the following compositions:

| | Parts by weight | |
|---|---|---|
| | A | B |
| Ethylene-propylene copolymer (propylene content=48 mol percent; ML (1+4) 100° C.=26) | 100 | |
| Ethylene-propylene copolymer (propylene content=54 mol percent; ML (1+4) 100° C.=65) | | 73 |
| Paraffin oil (V.G.C.=0.80, d₁₅=0.861) | | 27 |
| Carbon black HAF | 30 | 30 |
| Zinc oxide | | 3 |
| Sulfur | 0.35 | 0.3 |
| alpha,alpha'-bis(tert. butylperoxy)-diisopropyl-benzene | 1.875 | 1.65 |

NOTE: Vulcanization=40 minutes at 165° C.

The values of adhesion, determined by the H test and expressed in kg., are reported in Table 2 as a function of the different molar composition of the resins as compared with those obtained when employing rayon as such.

TABLE 2

| | Type of resin | | | | | |
|---|---|---|---|---|---|---|
| | Maleic acid/ ethylene glycol | | | Maleic acid/ glycerine | | |
| Concentration of resins in dioxane | 5% | | | 5% | | |
| Molar ratio | 1:1 | 1:2 | 2:1 | 1:1 | 1:2 | 2:1 |
| Adhesion in kg. (H test): | | | | | | |
| Mix A | 4 | 8 | 9 | 6.2 | 5.8 | 6.2 | 3.8 |
| Mix B | 2 | 4.4 | 4.5 | 3.6 | 3.5 | 4.7 | 2 |

As it can be seen from Table 2, when employing for the treatment of the rayon cord an unsaturated resin falling outside the scope of the present invention (molar ratio maleic acid:ethylene glycol or maleic acid:glycerine=2:1) the adhesion which is obtained does not reach a statisfactory level.

EXAMPLE 3

Samples of rayon cord having the same characteristics as described in Example 1 were pretreated with an aqueous solution of resorcinol-formaldehyde resin. This solution was prepared at room temperature in the presence of an amount of NaOH required to provide a pH of 7, and aged for 4 hours. The concentration of the solution was 15% and the resorcinal-formaldehyde ratio 1:2. The pretreated samples were subsequently treated with dioxane solutions having various resin concentrations, the resin being maleic anhydride/glycerine or maleic anhydride/ethylene glycol.

The coated and dried cords were caused to adhere, by means of vulcanization, to mixtures having the following composition:

|  | Parts by weight | |
|---|---|---|
|  | A | B |
| Ethylene-propylene copolymer (propylene content = 48 mol percent; ML (1+4) 100° C.=26) | 100 |  |
| Ethylene-propylene copolymer (propylene content =54 mol percent; ML (1+4) 100° C.=65) |  | 73 |
| Paraffin oil (V.G.C. 0.80, $d_{15}$=0.861) |  | 27 |
| Carbon black HAF | 30 | 30 |
| Zinc oxide |  | 3 |
| Sulfur | 0.35 | 0.3 |
| Alpha,alpha'-bis(tert. butylperoxy)-diisopropyl-benzene | 1.875 | 1.65 |

NOTE: Vulcanization=40 minutes at 165° C.

Table 3 reports the values of adhesion expressed in kg. and determined according to the H test, in connection with (1) the molar ratios used in making the maleic anhydride/ethylene glycol resin and (2) the resin concentration in the dioxane solutions. Data is also given for the adhesion values for rayon pretreated with the above said mixtures in the absence of the polyster resins.

TABLE 3

|  | Type of resin | | | |
|---|---|---|---|---|
|  | Maleic anhydride/ ethylene glycol | | | |
| Molar ratio | 1:1 | | 1:2 | |
| Concentration of resins in dioxane, percent | 5 | 10 | 5 | 10 |
| Adhesion in kg. (H test): | | | | |
| Mix A | 7 | 11.1 | 11.1 | 9.9 | 9.2 |
| Mix B | 4 | 5.5 | 6 | 5.1 | 7.6 |

Variations can, of course, be made without departing from the spirit and scope of the invention.

Having thus described our invention, what we desire to secure and hereby claim by Letters Patent is:

1. A method of adhering rayon fibers to a saturated amorphous copolymer of ethylene with a higher alpha-olefin comprising treating said rayon fibers with a solution of an unsaturated polyester obtained by the reaction of maleic acid or maleic anhydride with an alkyl polyol, the molar ratio of said acid or anhydride to said polyol being from about 1:1 to 1:2, the concentration of said polyester in said solution being from about 3 to 10 percent by weight, drying the thus treated fibers, admixing the thus treated fibers with a mixture of said copolymer, an organic peroxide, and a free radical acceptor, and heating the resulting mixture to a temperature of from about 110 to 220° C.

2. The method of claim 1 wherein said resulting mixture is heated to a temperature of about 140 to 180° C. under a positive pressure.

3. The method of claim 1 wherein the solvent for said polyester is water and wherein said solution is, prior to the treating of said rayon fibers, neutralized to a pH of from about 6 to 7.

4. The method of claim 1 wherein said treatment of said fibers with said solution is effected by immersing said fibers in said solution and then drying said fibers, said immersing and drying being carried out until the amount of polyester deposited on said fibers is from about 3 to 20 percent by weight of said fibers, expressed on a dry basis.

5. The method of claim 1 wherein said unsaturated polyester is prepared by heating said acid or anhydride and said polyol for from about 4 to 6 hours at a temperature of from about 120 to 200° C. and the reaction is then completed under vacuum until the water formed by said reaction has been eliminated so as to obtain a polyester having a molecular weight of from about 200 to 1000 and an acid number of at least 50 mg. KOH/g.

6. The method of claim 1 wherein said rayon fibers are, prior to said treatment with said polyester solution, pretreated by immersing in an aqueous solution of a phenol-formaldehyde resin, said resin having been prepared by reacting a phenol and formaldehyde in a molar ratio of from about 1:1 to 1:3 in the presence of sodium hydroxide catalyst and the ageing for from about 4 to 7 hours.

7. The method of claim 1 wherein said polyester is the reaction product of maleic acid and ethylene glycol.

8. The method of claim 1 wherein said polyester is the reaction product of maleic acid and glycerine.

9. The method of claim 1 wherein said polyester is the reaction product of maleic anhydride and ethylene glycol.

10. The method of claim 1 wherein said polyester is the reaction product of maleic anhydride and glycerine.

11. The method of claim 1 wherein said copolymer is a copolymer of ethylene and propylene having an ethylene molar content of from about 20 to 80 percent and a molecular weight of from about 60,000 to 800,000.

12. The method of claim 1 wherein said copolymer is a copolymer of ethylene and butene-1 having an ethylene molar content of from about 20 to 80 percent and a molecular weight of from about 60,000 to 800,000.

13. The method of claim 11 wherein said molecular weight is from about 80,000 to 500,000.

14. The method of claim 12 wherein said molecular weight is from about 80,000 to 500,000.

15. The method of claim 1 wherein said organic peroxide is employed in an amount of from about 0.1 to 10 parts by weight per 100 parts of copolymer.

16. The method of claim 1 wherein said free radical acceptor is selected from the group consisting of sulfur, quinones, vinyl compounds, allyl compounds, dimaleimides, furfural, and furfural derivatives, the amount of said free radical acceptor employed being from about 0.1 to 10 parts by weight per 100 parts of copolymer.

17. The method of claim 1 wherein said mixture additionally contains a carbon black reinforcing filler.

18. The method of claim 1 wherein said fibers are in the form of a fabric.

19. A rayon-reinforced, elastomeric, amorphous copolymer of ethylene with a higher alpha-olefin, said reinforced product being obtained by treating rayon fibers with a solution of an unsaturated polyester obtained by the reaction of maleic acid or maleic anhydride with an alkyl polyol, the molar ratio of said acid or anhydride to said polyol being from about 1:1 to 1:2, and the concentration of said polyester in said solution being from about 3 to 10 percent by weight, drying the thus treated fibers, admixing the thus treated fibers with a mixture of said copolymer, an organic peroxide, and a free radical acceptor, and then heating the resulting mixture to a temperature of from about 110 to 220° C.

References Cited

UNITED STATES PATENTS 3,308,007  3/1967  Shepard.
3,427,183  2/1969  Portolani et al. __ 156—110 XR LELAND A. SEBASTIAN, Primary Examiner U.S. Cl. X.R.

117—76, 161; 156—332; 161—232

UNITED STATES PATENT OFFICE
CERTIFICATE OF CORRECTION

Patent No. 3,522,120  Dated July 28, 1970

Inventor(s) Gian Vittorio Giandinoto and Mario Milano

It is certified that error appears in the above-identified patent and that said Letters Patent are hereby corrected as shown below:

Column 1, line 67, "3 to 10%," should read -- 3 to 10% --.

Column 2, line 6, "140° to 180°" should read -- 140° to 180°C, --. Column 5, line 2, "ratio 1:2." should read -- ratio was 1:2. --. Column 6, line 42, "sulfur." should read -- sulfur, --.

SIGNED AND
SEALED
Nov 24 1970

(SEAL)
Attest:

Edward M. Fletcher, Jr.
Attesting Officer

WILLIAM E. SCHUYLER, JR.
Commissioner of Patents